(12) United States Patent
Jennings et al.

(10) Patent No.: US 7,981,505 B2
(45) Date of Patent: Jul. 19, 2011

(54) COATED ARTICLES AND MULTI-LAYER COATINGS

(75) Inventors: Robert E. Jennings, Ellwood City, PA (US); James A. Claar, Apollo, PA (US); Eldon L. Decker, Gibsonia, PA (US); Noel R. Vanier, Wexford, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 807 days.

(21) Appl. No.: 10/876,291

(22) Filed: Jun. 24, 2004

(65) Prior Publication Data

US 2005/0287354 A1    Dec. 29, 2005

(51) Int. Cl.
*B32B 5/16* (2006.01)
*B32B 27/08* (2006.01)

(52) U.S. Cl. ........................................ 428/327; 428/323
(58) Field of Classification Search .................. None
See application file for complete search history.

(56) References Cited

U.S. PATENT DOCUMENTS

| | | | |
|---|---|---|---|
| 3,389,061 A | 6/1968 | Bono | 106/308 M |
| 4,499,143 A | 2/1985 | Panush | 428/336 |
| 5,106,533 A | 4/1992 | Hendrickson et al. | 252/314 |
| 5,201,948 A | 4/1993 | Fasano et al. | 106/311 |
| 5,334,297 A | 8/1994 | Nakada et al. | 204/181.2 |
| 5,340,789 A | 8/1994 | Evans et al. | 503/227 |
| 5,538,548 A | 7/1996 | Yamazaki | 106/20 |
| 5,538,549 A | 7/1996 | Kato et al. | 106/20 |
| 5,676,813 A * | 10/1997 | Nakamura et al. | 205/50 |
| 5,716,435 A | 2/1998 | Aida et al. | 106/31.85 |
| 5,837,041 A | 11/1998 | Bean et al. | 106/31.6 |
| 5,902,711 A | 5/1999 | Smith et al. | 430/137 |
| 5,942,027 A | 8/1999 | Ikai et al. | 106/31.33 |
| 5,990,219 A | 11/1999 | Sakai et al. | 524/441 |
| 6,009,627 A | 1/2000 | Dassoulas et al. | 30/392 |
| 6,030,440 A | 2/2000 | Sekioka et al. | 106/31.65 |
| 6,031,024 A | 2/2000 | Sekioka et al. | 523/161 |
| 6,083,564 A * | 7/2000 | Igarashi et al. | 427/407.1 |
| 6,153,001 A | 11/2000 | Suzuki et al. | 106/31.65 |
| 6,267,810 B1 | 7/2001 | Pfaff et al. | 106/415 |
| 6,410,619 B2 | 6/2002 | Greene et al. | 524/88 |
| 6,417,249 B1 | 7/2002 | Nguyen et al. | 523/201 |
| 6,565,973 B2 * | 5/2003 | Duff et al. | 428/402 |
| 6,589,649 B2 * | 7/2003 | Oya et al. | 428/343 |
| 6,660,793 B1 * | 12/2003 | McIntyre et al. | 524/441 |
| 6,833,184 B2 * | 12/2004 | Damnjanovic et al. | 428/323 |
| 2002/0193514 A1 | 12/2002 | Wang et al. | 524/853 |
| 2003/0125417 A1 | 7/2003 | Vanier et al. | 523/171 |
| 2004/0028822 A1 | 2/2004 | Dutt et al. | 427/385.5 |
| 2004/0028823 A1 * | 2/2004 | Dutt | 427/385.5 |

FOREIGN PATENT DOCUMENTS

| | | |
|---|---|---|
| EP | 0388932 A2 | 3/1990 |
| EP | 1006161 A1 | 6/1999 |
| WO | WO 2005/000914 A1 | 1/2005 |

* cited by examiner

*Primary Examiner* — Monique R Jackson
(74) *Attorney, Agent, or Firm* — Donald R. Palladino

(57) ABSTRACT

Articles are disclosed wherein a color-imparting non-hiding coating layer is deposited on a surface thereof. The coating layer is deposited from a protective coating composition comprising color-imparting particles having a maximum haze of about 10% and a film-forming resin. Methods of using the coatings, and the substrates coated therewith, are also disclosed.

19 Claims, 1 Drawing Sheet

COATED ARTICLES AND MULTI-LAYER COATINGS

CROSS-REFERENCE TO RELATED APPLICATIONS

This application is related to U.S. patent application Ser. Nos. 10/876,315 and 10/876,031, filed concurrently herewith.

FIELD OF THE INVENTION

The present invention relates to articles having a surface, wherein a color-imparting non-hiding coating layer is deposited on at least a portion of the surface. The coating layer is deposited from a protective coating composition comprising color-imparting particles having low haze (high transparency) and a film-forming resin. The present invention is also directed to multi-layer coatings that include such color-imparting layers.

BACKGROUND OF THE INVENTION

"Color-plus-clear" coating systems involving the application of a colored pigmented basecoat to a substrate followed by application of a clear topcoat over the basecoat have become increasingly popular as original finishes for a number of consumer products including, for example, cars and floor coverings such as ceramic tiles and wood flooring. The base-plus-clear coating systems can have outstanding appearance properties, including gloss and distinctness of image.

"Tricoat" coating systems are used in certain coating applications. Such systems can achieve a deep transparent color effect as compared with the two-step base-plus-clear coating systems described above. Tricoat systems include an additional color-imparting non-hiding layer deposited between the basecoat layer and clear topcoat layer. A standard tricoat process involves the application of a first stage pigmented basecoat, with or without a reflective component, such as metallic and/or micaeous interference flakes, followed by the application of a second stage color-imparting non-hiding coating layer and then a clear topcoat.

One purpose of the color-imparting non-hiding coating layer in certain tricoat systems can be to provide color depth and richness to the basecoat layer, which is sometimes known as the "candied" effect. For example, in certain applications, an organic red non-hiding coating layer may be applied over a red metallic basecoat layer to enhance the red color depth and richness of the red metallic basecoat. In some tricoat systems, a color-imparting non-hiding coating layer provides a contrasting color effect over the basecoat layer because of the combination of colors applied. For example, in certain applications, an organic red non-hiding layer may be applied over a silver metallic basecoat layer to provide a red metallic appearance. In another example, an organic yellow non-hiding layer may be applied over a red metallic basecoat layer to provide an orange metallic appearance.

In some cases, such color-imparting non-hiding coating layers are applied over a basecoat layer as described above but without application of an additional clearcoat layer. In these instances, the color-imparting non-hiding coating layer typically provides properties similar to a traditional clearcoat.

In other cases, these color-imparting non-hiding coating layers may be applied as a single coating layer directly to a substrate with no basecoat or clearcoat layer present. Again, such color-imparting non-hiding coating layers typically provide both color and protection to the substrate.

Historically, dyes have been used to achieve a transparent coloration in such color-imparting non-hiding coating layers. In such applications, dyes are considered organic colorants that are completely soluble within the coating medium and which do not scatter light in the solvated state. Dyes, however, often possess poorer fastness than pigments when exposed to ambient light and weathering conditions. Dyes often possess poorer color persistencies than pigments due to their tendency to migrate to the surface of the coating. In certain dyes, heavy metals are incorporated to impart coloration and, in turn, enhance the fastness properties of the dyes. Many heavy metals, however, are considered toxic and, as a result, there are obvious health and safety concerns with their use. Additionally, dyes may migrate to the surface of the coating layer, which can lead to loss of color.

Thus, there is a need in the coatings art for coated articles having deposited thereon a color-imparting non-hiding coating layer that can have transparency and color comparable to that of a similar coating layer containing dyes and color persistence properties similar to conventionally pigmented coatings.

SUMMARY OF THE INVENTION

In one, respect, the present invention is directed to articles comprising a surface, wherein a color-imparting non-hiding coating layer deposited from a protective coating composition is deposited on at least a portion of the surface. The protective coating composition comprises color-imparting particles having a maximum haze of about 10% and a film-forming resin.

In another respect, the present invention is directed to multi-layer coatings. The multi-layer coatings of the present invention comprise: (a) a color-imparting non-hiding coating layer deposited from a protective coating composition comprising color-imparting particles having a maximum haze of about 10% and a film-forming resin; and (b) a clearcoat layer deposited over the color-imparting non-hiding layer.

In still another respect, the present invention is directed to a multi-layer coating system comprising: (a) a basecoat layer deposited from a film-forming composition comprising a resinous binder and a pigment; (b) a color-imparting non-hiding coating layer deposited over at least a portion of the basecoat layer; and (c) a clearcoat layer deposited over at least a portion of the color-imparting non-hiding layer. The color-imparting non-hiding coating layer is deposited from a protective coating composition comprising color-imparting particles having a maximum haze of about 10% and a film-forming resin. The clearcoat layer is deposited from a film-forming composition comprising a resinous binder.

Methods for using these compositions are also within the scope of invention, as are substrates coated according to these methods.

DESCRIPTION OF EMBODIMENTS OF THE INVENTION

Figure 1:
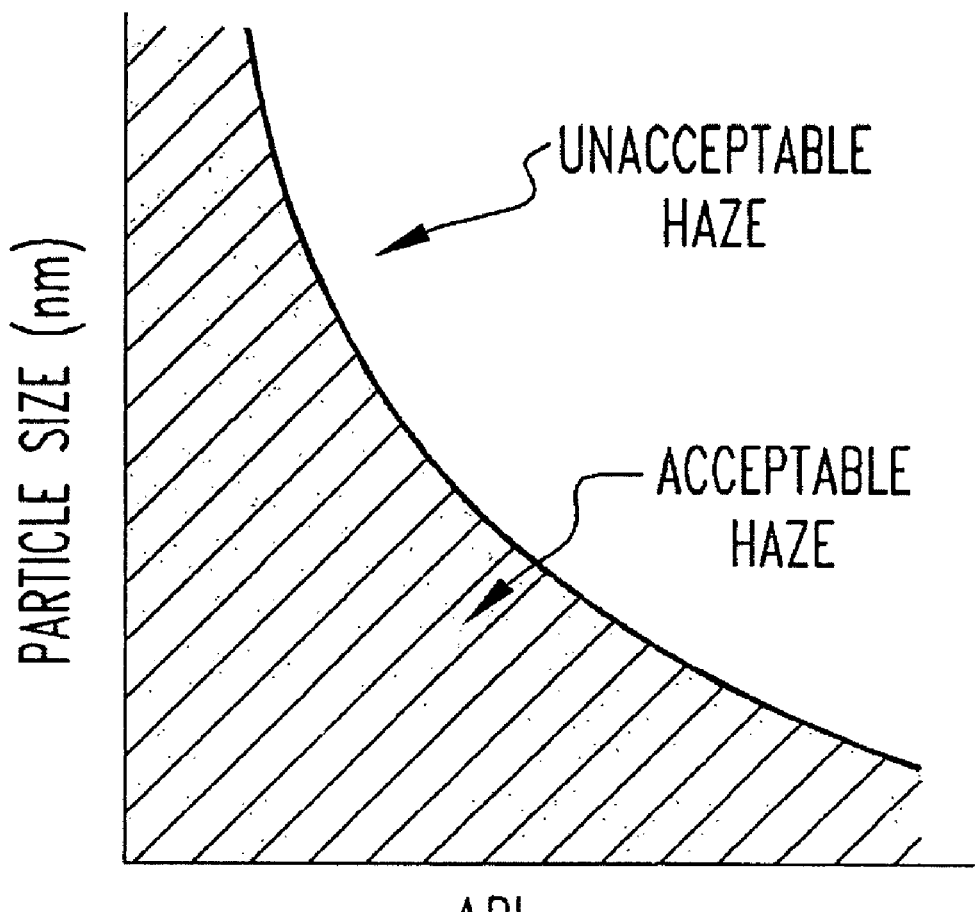
FIG. 1 is a graph of particle size versus difference in refractive index for colorant particles suspended in a resinous binder.

Other than in the operating examples, or where otherwise indicated, all numbers, numerical parameters and/or ranges expressing, for example, quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Certain embodiments of the present invention are directed to articles comprising a surface, wherein a color-imparting non-hiding coating layer is deposited on at least a portion of the surface, and wherein the layer is deposited from a protective coating composition comprises color-imparting particles having a maximum haze of about 10% and a film-forming resin.

As used herein, the term "non-hiding coating layer" refers to a coating layer wherein, when deposited onto a surface, the surface beneath the coating layer is visible. In certain embodiments of the present invention, the surface beneath the non-hiding coating layer is visible when the non-hiding layer is applied at a typical dry film thickness known in the art of automotive refinish coatings, such as 0.5 to 5.0 mils (12.7 to 127 microns). One way to assess non-hiding is by measurement of opacity. As used herein, "opacity" refers to the degree to which a material obscures a substrate.

"Percent opacity" refers herein to the ratio of the reflectance of a dry coating film over a black substrate of 5% or less reflectance, to the reflectance of the same coating film, equivalently applied and dried, over a substrate of 85% reflectance. The percent opacity of a dry coating film will depend on the dry film thickness of the coating and the concentration of color-imparting particles. In certain embodiments of the present invention, the color-imparting non-hiding coating layer has a percent opacity of no more than 90 percent, such as no more than 50 percent, at a dry film thickness of one (1) mil (about 25 microns).

As used herein, the term "protective coating composition" refers to a composition that, when deposited onto a surface, provides protection of that surface from degradation due to surrounding environmental conditions in order to retain the integrity of that surface, unlike inks. Non-limiting examples of degradation due to environmental conditions include oxidation and light degradation. In addition, a protective coating composition normally possesses mechanical properties such as scratch and mar resistance.

Certain embodiments of the present invention are directed to an article having a surface, wherein a protective coating composition comprising color-imparting particles is deposited on at least a portion of the surface. As used herein, the term "color-imparting particles" refers to particles having little or no solubility in the protective coating composition and which impart color to the composition. Non-limiting examples of such color-imparting particles include pigments that impart a color such as red, green, yellow, and blue, among others. Suitable pigment compositions that may make up the color-imparting particles and which may be used in the present invention include, without limitation, azo (monoazo, disazo, β-naphthol, naphthol AS, salt type (azo pigment lakes), benzimidazolone, disazo condensation, azo metal complex, (isoindolinone, isoindoline) and polycyclic (phthalocyanine, quinacridone, perylene, perinone, diketopyrrolo pyrrole, thioindigo, anthraquinone (indanthrone, anthrapyrimidine, flavanthrone, pyranthrone, anthanthrone, dioxazine, triarylcarbonium, quinophthalone) pigments, and mixtures thereof.

In the present invention, the color-imparting particles present in the protective coating composition have a maximum haze of 10%, such as a maximum haze of 5%, or a maximum haze of 1%, or, in yet other embodiments, a maximum haze of 0.5%. As used herein, "haze" refers to a measurement of the transparency of a material and is defined by ASTM D1003.

The haze values for the color-imparting particles described herein can be determined by first having the color-imparting particles dispersed in a liquid (such as water, organic solvent, or a dispersant, as described herein) and then measuring these dispersions diluted in a solvent, for example, butyl acetate, using a Byk-Gardner TCS (The Color Sphere) instrument having a 500 micron cell path length. Because the % haze of a liquid sample is concentration dependent, we specify herein the % haze at a transmittance of about 15% to about 20% at the wavelength of maximum absorbance. As generally shown in FIG. 1, an acceptable haze may be achieved for relatively large particles when the difference in refractive index between the particles and the surrounding medium is low. Conversely, for smaller particles, greater refractive index differences between the particle and the surrounding medium may provide an acceptable haze.

Generally, to achieve the desired haze (minimal scattering) of no more than 10%, the color-imparting particles have an average primary particle size of no more than 150 nanometers. Therefore, in certain embodiments, the color-imparting particles present in the protective coating composition have such a primary particle size. Such particles may, for example, be prepared by milling bulk pigments with milling media having a particle size of about 0.3 millimeters, such as about 0.2 millimeters, or, in some cases, about 0.1 millimeters.

In certain embodiments of the present invention, pigment particles are milled to nanoparticulate sizes in a high energy mill in an organic solvent system, such as butyl acetate, using a dispersant, such as Solsperse® 32,500 or Solsperse® 32,000 both available from The Lubrizol Corporation of Wickliffe, Ohio or in water using a dispersant, such as Solsperse® 27,000 available from The Lubrizol Corporation with an optional polymeric grinding resin. Other suitable methods of producing the color-imparting particles of the present invention include crystallization, precipitation, gas phase condensation, and chemical attrition (i.e., partial dissolution). It should be noted that any known method for producing the color-imparting particles could be employed, provided that re-agglomeration of the color-imparting particles is minimized or avoided altogether.

Average primary particle size measurement can be obtained with a Philips CM12 transmission electron microscope (TEM) at 100 kV, as will be understood by those skilled in the art.

In certain embodiments, the color-imparting particles may be present in the protective coating composition in an amount of at least 0.01 weight percent up to 50 weight percent based on weight of total solids in the protective coating composition. The amount of the color-imparting particles present in the protective coating of the present invention can range between any combinations of the recited values, inclusive of the recited values.

In certain embodiments, the color-imparting non-hiding coating layer comprises color-imparting particles of one color or, in other embodiments; such a layer comprises a mixture of particles of at least two or more colors.

The protective coating composition used in the present invention includes a film-forming resin. As used herein, "film-forming" refers to resins that can form a self-supporting continuous film on at least a horizontal surface of a substrate upon removal of any solvents or carriers present in the composition or upon curing at ambient or elevated temperature.

Conventional film-forming resins that may be used in such protective coating compositions include those typically used in automotive OEM coating compositions, automotive refinish coating compositions, industrial coating compositions, architectural coating compositions, powder coating compositions, coil coating compositions, and aerospace coating compositions, among others.

Suitable resins include, for example, those formed from the reaction of a polymer having at least one type of reactive functional group and a curing agent having functional groups reactive with the functional group(s) of the polymer. As used herein, the term "polymer" is meant to encompass oligomers, and includes without limitation both homopolymers and copolymers. The polymers can be, for example, acrylic, polyester, polyurethane or polyether, polyvinyl, cellulosic, acrylate, silicon-based polymers, co-polymers thereof, and mixtures thereof, and can contain functional groups such as epoxy, carboxylic acid, hydroxyl, isocyanate, amide, carbamate and carboxylate groups.

The acrylic polymers, if used, are typically copolymers of acrylic acid or methacrylic acid or hydroxyalkyl esters of acrylic or methacrylic acid such as hydroxyethyl methacrylate or hydroxypropyl acrylate with one or more other polymerizable ethylenically unsaturated monomers such as alkyl esters of acrylic acid including methyl methacrylate and 2-ethyl hexyl acrylate, and vinyl aromatic compounds such as styrene, alpha-methyl styrene and vinyl toluene. The ratio of reactants and reaction conditions are selected to result in an acrylic polymer with pendant hydroxyl or carboxylic acid functionality.

Besides acrylic polymers, the protective coating compositions used in the present invention can contain a polyester polymer or oligomer, including those containing free terminal hydroxyl and/or carboxyl groups. Such polymers may be prepared in a known manner by condensation of polyhydric alcohols and polycarboxylic acids. Suitable polyhydric alcohols include ethylene glycol, neopentyl glycol, trimethylol propane and pentaerythritol.

Suitable polycarboxylic acids include adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters may be used. Also, small amounts of monocarboxylic acids such as stearic acid may be used.

Hydroxyl-containing polyester oligomers can be prepared by reacting an anhydride of a dicarboxylic acid such as hexahydrophthalic anhydride with a diol such as neopentyl glycol in a 1:2 molar ratio.

Where it is desired to enhance air-drying, suitable drying oil fatty acids may be used and include those derived from linseed oil, soya bean oil, tall oil, dehydrated castor oil or tung oil.

Polyurethane polymers containing terminal isocyanate or hydroxyl groups may also be used. The polyurethane polyols or NCO-terminated polyurethanes which can be used include those prepared by reacting polyols including polymeric polyols with polyisocyanates. The polyurea-containing terminal isocyanate or primary or secondary amine groups which can be used include those prepared by reacting polyamines including polymeric polyamines with polyisocyanates. The hydroxyl/isocyanate or amine/isocyanate equivalent ratio is adjusted and reaction conditions selected to obtain the desired terminal group. Examples of suitable polyisocyanates include those described in U.S. Pat. No. 4,046,729 at column 5, line 26 to column 6, line 28, hereby incorporated by reference. Examples of suitable polyols include those described in U.S. Pat. No. 4,046,729 at column 7, line 52 to column 10, line 35, hereby incorporated by reference. Examples of suitable polyamines include those described in U.S. Pat. No. 4,046,729 at column 6, line 61 to column 7, line 32 and in U.S. Pat. No. 3,799,854 at column 3, lines 13 to 50, both hereby incorporated by reference.

As previously mentioned, a silicon-based polymer can also be used. As used herein, by "silicon-based polymers" is meant a polymer comprising one or more —SiO— units in the backbone. Such silicon-based polymers can include hybrid polymers, such as those comprising organic polymeric blocks with one or more —SiO— units in the backbone.

As mentioned earlier, certain protective coating compositions used in the present invention can include a film-forming resin that is formed from the use of a curing agent. Curing agents suitable for use in the protective coating compositions used in the present invention can include aminoplast resins and phenoplast resins and mixtures thereof, as curing agents for OH, COOH, amide, and carbamate functional group containing materials. Examples of aminoplast and phenoplast resins suitable as curing agents in curable compositions that may be used in the present invention include those described in U.S. Pat. No. 3,919,351 at col. 5, line 22 to col. 6, line 25, hereby incorporated by reference.

Also suitable are polyisocyanates and blocked polyisocyanates as curing agents for OH and primary and/or secondary amino group-containing materials. Examples of polyisocyanates and blocked isocyanates suitable for use as curing agents in curable compositions that may be used in the present invention include those described in U.S. Pat. No. 4,546,045 at col. 5, lines 16 to 38; and in U.S. Pat. No. 5,468,802 at col. 3, lines 48 to 60, both hereby incorporated by reference.

Anhydrides as curing agents for OH and primary and/or secondary amino group containing materials are well known in the art. Examples of anhydrides suitable for use as curing agents in the protective coating compositions that may be used in the present invention include those described in U.S. Pat. No. 4,798,746 at col. 10, lines 16 to 50; and in U.S. Pat. No. 4,732,790 at col. 3, lines 41 to 57, both hereby incorporated by reference.

Polyepoxides as curing agents for COOH functional group containing materials are well known in the art. Examples of polyepoxides suitable for use as curing agents in the protective coating compositions that may be used in the present invention include those described in U.S. Pat. No. 4,681,811 at col. 5, lines 33 to 58, hereby incorporated by reference.

Polyacids as curing agents for epoxy functional group containing materials are well known in the art. Examples of polyacids suitable for use as curing agents in the protective coating compositions that may be used in the present invention include those described in U.S. Pat. No. 4,681,811 at col. 6, line 45 to col. 9, line 54, hereby incorporated by reference.

Polyols, that is, material having an average of two or more hydroxyl groups per molecule, can be used as curing agents for NCO functional group containing materials and anhydrides and esters and are well known in the art. Examples of said polyols include those described in U.S. Pat. No. 4,046,729 at col. 7, line 52 to col. 8, line 9; col. 8, line 29 to col. 9, line 66; and in U.S. Pat. No. 3,919,315 at col. 2, line 64 to col. 3, line 33, both hereby incorporated by reference.

Polyamines can also be used as curing agents for NCO functional group containing materials and for carbonates and unhindered esters and are well known in the art. Examples of polyamines suitable for use as in the protective coating compositions that may be used in the present invention include those described in U.S. Pat. No. 4,046,729 at col. 6, line 61 to col. 7, line 26, and in U.S. Pat. No. 3,799,854 at column 3, lines 13 to 50, hereby incorporated by reference.

When desired, appropriate mixtures of curing agents may be used. Moreover, the protective coating compositions used in the present invention can be formulated as a one-component composition where a curing agent such as an aminoplast resin and/or a blocked isocyanate compound such as those described above is admixed with other composition components. The one-component composition can be storage stable as formulated. Alternatively, such compositions can be formulated as a two-component composition where, for example, a polyisocyanate curing agent such as those described above can be added to a pre-formed admixture of the other composition components just prior to application. The pre-formed admixture can comprise curing agents for example, aminoplast resins and/or blocked isocyanate compounds such as those described above.

In certain embodiments, the film-forming resin is generally present in the protective coating composition in an amount greater than about 30 weight percent, such as greater than about 40 weight percent, and less than 90 weight percent, with weight percent being based on the total solid weight of the composition. For example, the weight percent of resin can be between 30 and 90 weight percent. When a curing agent is used, it is generally present in an amount of up to 70 weight percent, typically between 10 and 70 weight percent; this weight percent is also based on the total solid weight of the coating composition.

The protective coating compositions used in the present invention can be formed from film-forming resins that are liquid, that is, waterborne or solventborne systems. Suitable diluents include organic solvents, water, and/or water/organic solvent mixtures. Organic solvents in which the protective coating compositions may be dispersed include, for example, alcohols, ketones, aromatic hydrocarbons, glycol ethers, esters or mixtures thereof. The diluent is generally present in amounts ranging from 5 to 80 weight percent based on total weight of the composition, such as 30 to 50 percent.

The protective coating compositions used in the present invention can also comprise optional ingredients such as those well known in the art of formulating surface coatings. Such optional ingredients can comprise, for example, surface active agents, flow control agents, thixotropic agents, fillers, anti-gassing agents, organic co-solvents, catalysts, antioxidants, light stabilizers, UV absorbers and other customary auxiliaries. Any such additives known in the art can be used, absent compatibility problems, so long as the resulting coating layer deposited from the composition is non-hiding as described above. Nonlimiting examples of these materials are described in U.S. Pat. Nos. 4,220,679; 4,403,003; 4,147,769; and 5,071,904, which patents are incorporated herein by reference. In certain cases, each of the optional ingredients can be present in amounts as low as 0.01 weight percent and as high as 20.0 weight percent. Usually the total amount of optional ingredients will range from 0.01 to 25 weight percent, based on total weight of the composition.

In certain embodiments, the protective coating composition may further comprise an optical-effect pigment. As used herein, the term "optical effect pigment" refers to pigments used to modify the optical characteristics of the coating layer. Non-limiting examples of suitable optical-effect pigments include mica-based pigments, borosilicate-based pigments, bismuth oxychloride crystals, aluminum-based pigments, liquid crystal flakes, or combinations thereof. The amount of such optical effect pigment present in the protective coating composition is not particularly limited, so long as the resulting coating layer deposited from the composition is non-hiding as described above.

Moreover, in certain embodiments, the color-imparting non-hiding layer is deposited on a reflective surface. For example, in certain embodiments, the color-imparting non-hiding coating layer is deposited over a surface comprising a reflective material having a total reflectance of at least 30%, such as at least 40%. "Total reflectance" refers herein to the ratio of reflected light from an object relative to the incident light that impinges on the object in the visible spectrum integrating over all viewing angles. "Visible spectrum" refers herein to that portion of the electromagnetic spectrum between wavelengths 400 and 700 nanometers. "Viewing angle" refers herein to the angle between the viewing ray and a normal to the surface at the point of incidence. The reflectance values described herein are determined using the Minolta Spectrophotometer CM-3600d with the procedure described in the Examples section.

In certain embodiments, the reflective material comprises a substrate such as, for example, polished aluminum, cold roll steel, chrome-plated metal, or vacuum deposited metal on plastic, among others. In other embodiments, the reflective material may comprise a previously coated surface which may, for example, comprise a basecoat layer deposited from a coating composition, such as for example a silver metallic basecoat layer, a colored metallic basecoat layer, or a white basecoat layer, among others.

Such basecoat layers may be deposited from a base-coat film-forming composition that may, for example, include any of the previously described film-forming resins used in the protective coating composition described earlier. For example, the film-forming composition of the basecoat may comprise a resinous binder and one or more pigments to act as the colorant. Useful resinous binders are acrylic polymers, polyesters, including alkyds and polyurethanes, such as any of those discussed in detail above. The resinous binders for the basecoat may, for example, comprise organic solvent-based materials or water-based coating compositions.

As noted, the basecoat composition can contain pigments as colorants. Suitable pigments for the basecoat composition include, for example, metallic pigments, which include aluminum flake, copper or bronze flake and metal oxide coated mica; non-metallic color pigments, such as titanium dioxide, iron oxide, chromium oxide, lead chromate, and carbon black; as well as organic pigments, such as, for example, phthalocyanine blue and phthalocyanine green.

Optional ingredients suitable for inclusion in the basecoat composition include those, which are well known in the art of formulating surface coatings, such as those materials described earlier. The solids content of the basecoat composition often generally ranges from 15 to 60 weight percent, or 20 to 50 weight percent.

The basecoat composition can be applied to a substrate by any conventional coating technique such as brushing, spraying, dipping or flowing, among others. The usual spray techniques and equipment for air spraying, airless spraying and electrostatic spraying in either manual or automatic methods can be used. During application of the basecoat to the substrate, the film thickness of the basecoat formed on the substrate often ranges from 0.1 to 5 mils (2.5 to 127 micrometers), or 0.1 to 2 mils (2.5 to 50.8 micrometers).

After forming a film of the basecoat on the substrate, the basecoat can be cured or alternatively given a drying step in which solvent is driven out of the basecoat film by heating or an air drying period before application of subsequent coating compositions. Suitable drying conditions will depend on the particular basecoat composition, and one the ambient humidity if the composition is water-borne, but often, a drying time of from 1 to 15 minutes at a temperature of 75° to 200° F. (21° to 93° C.) will be adequate.

Referring once again to the color-imparting non-hiding coating layer, the color-imparting particles included in the protective coating composition from which such a layer is deposited may, in certain embodiments, be stably dispersed in an aqueous medium. In these embodiments, such a protective coating composition may be prepared by (a) providing the color-imparting particles described above, (b) admixing the color-imparting particles with (1) one or more polymerizable, ethylenically unsaturated monomers; or (2) a mixture of one or more polymerizable unsaturated monomers with one or more polymers; or (3) one or more polymers, to form an admixture; (c) subjecting the admixture to high stress shear conditions in the presence of an aqueous medium to particularize the admixture into microparticles; and (d) optionally, polymerizing said ethylenically unsaturated monomers under free radical polymerization conditions.

In certain embodiments, the color-imparting particles are present in such aqueous dispersions in an amount of at least 0.1 weight percent, or at least 5 weight percent, or at least 10 weight percent, based on weight of total solids present in the dispersion. Also, the color-imparting particles can be present in such aqueous dispersions in an amount of up to 50 weight percent, or up to 40 weight percent, or up to 35 weight percent, based on weight of total solids present in the dispersion. The amount of the color-imparting particles present in such aqueous dispersions can range between any combinations of the recited values, inclusive of the recited values.

In certain embodiments, the aqueous dispersion is prepared by admixing, optionally in the presence of an aqueous medium, the color-imparting particles with (1) one or more polymerizable, ethylenically unsaturated monomers; and/or (2) a mixture of one or more polymerizable unsaturated monomers with one or more polymers; and/or (3) one or more polymers, to form an admixture. The admixture then is subjected to high shear stress conditions (described in detail below) in the presence of an aqueous medium to particularize the admixture into microparticles. If present, the ethylenically unsaturated monomers then can be polymerized under free radical conditions as described below.

In such aqueous dispersions, the aqueous medium in which the color-imparting particles are dispersed generally is exclusively water. However, for some monomer and/or polymer systems, it can be desirable to also include a minor amount of inert organic solvent that can assist in lowering the viscosity of the polymer to be dispersed. In certain embodiments, the amount of organic solvent present in the aqueous dispersion is less than 20 weight percent, such as less than 10 weight percent, or, in some embodiments, less than 5 weight percent, or less than 2 weight percent based on total weight of the dispersion. For example, if the organic phase has a Brookfield viscosity greater than 1000 centipoise at 25° C. or a W Gardner Holdt viscosity, some solvent can be used. Examples of suitable solvents that can be incorporated include, but are not limited to, propylene glycol monobutyl ether, ethylene glycol monohexyl ether, ethylene glycol monobutyl ether, n-butanol, benzyl alcohol, and mineral spirits.

When included, the polymerizable ethylenically unsaturated monomers can include any of the ethylenically unsaturated monomers, including vinyl monomers known in the art. Non-limiting examples of useful ethylenically unsaturated carboxylic acid functional group-containing monomers include (meth)acrylic acid, beta-carboxyethyl acrylate, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. As used herein, "(meth)acrylic" and terms derived therefrom are intended to include both acrylic and methacrylic.

Non-limiting examples of other useful ethylenically unsaturated monomers free of carboxylic acid functional groups include alkyl esters of (meth)acrylic acids, for example, ethyl (meth)acrylate, methyl (meth)acrylate, butyl (meth)acrylate, 2-ethylhexyl (meth)acrylate, 2-hydroxyethyl (meth)acrylate, hydroxypropyl (meth)acrylate, hydroxy butyl (meth)acrylate, isobornyl (meth)acrylate, lauryl (meth)acrylate, and ethylene glycol di(meth)acrylate; vinyl aromatics such as styrene and vinyl toluene; (meth)acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

The ethylenically unsaturated monomers can include ethylenically unsaturated, beta-hydroxy ester functional monomers, such as those derived from the reaction of an ethylenically unsaturated acid functional monomer, such as a monocarboxylic acid, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols such as butyl glycidyl ether, octyl glycidyl ether, phenyl glycidyl ether and the like. Suitable epoxy compounds include those having the following structure (I):

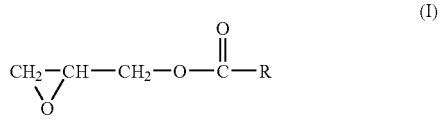

where R is a hydrocarbon radical containing from 4 to 26 carbon atoms. Suitable glycidyl esters include those that are commercially available from Shell Chemical Company under the tradename CARDURA E and from Exxon Chemical Company under the tradename GLYDEXX-10. Alternatively, the beta-hydroxy ester functional monomers can be prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

As previously mentioned, the color-imparting particles also can be admixed with one or more polymers. Suitable polymers include, without limitation, those previously described with respect to the film-forming resins discussed earlier. Other useful polymers can include polyamides, such as acrylamide, methacrylamide, N-alkylacrylamides and N-alkylmethacrylamides.

Polyethers can also be used to prepare the aqueous dispersion of color-imparting particles that may be used in certain embodiments of the present invention. Examples of suitable polyether polymers can include, for example polyether polyols such as polyalkylene ether polyols having the following structural formulas (II) or (III):

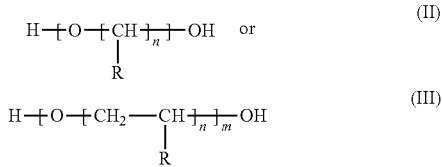

wherein the substituent R is hydrogen or a lower alkyl group containing from 1 to 5 carbon atoms including mixed substituents, and n has a value typically ranging from 2 to 6 and m has a value ranging from 8 to 100 or higher. Exemplary polyalkylene ether polyols include poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E. I. Du Pont de Nemours and Company, Inc.

Suitable methods for homo- and co-polymerizing ethylenically unsaturated monomers and/or other addition polymerizable monomers and preformed polymers are well known to those skilled in the art of polymer synthesis and further discussion thereof is not believed to be necessary in view of the present disclosure. For example, polymerization of the ethylenically unsaturated monomers can be carried out in bulk, in aqueous or organic solvent solution such as benzene or n-hexane, in emulsion, or in aqueous dispersion. *Kirk-Othmer Encyclopedia of Chemical Technology*, Vol. 1 (1963) at page 305. The polymerization can be effected by means of a suitable initiator system, including free radical initiators such as benzoyl peroxide or azobisisobutyronitrile, anionic initiation and organometallic initiation. Molecular weight can be controlled by choice of solvent or polymerization medium, concentration of initiator or monomer, temperature, and the use of chain transfer agents. If additional information is needed, such polymerization methods are disclosed in *Kirk-Othmer*, Vol. 1 at pages 203-205, 259-297 and 305-307.

Generally, the polymers which are useful in the preparation of the aqueous dispersion of microparticles comprising color-imparting particles that may be present in the protective coating composition used in the present invention can have a weight average molecular weight (Mw) ranging from 1000 to 20,000, or 1500 to 15,000, or 2000 to 12,000 as determined by gel permeation chromatography using a polystyrene standard. The polymers suitable for use in the preparation of such aqueous dispersions of color-imparting particles can be either thermosettable or thermoplastic.

The polymers useful in the preparation of the aqueous dispersion of microparticles comprising color-imparting particles can also include one or materials typically referred to as crosslinking agents. Suitable crosslinking agents include those discussed earlier, such as polyisocyanates and aminoplast resins, among others.

In certain embodiments, the aqueous dispersion of microparticles comprising color-imparting particles is prepared by admixing the color-imparting particles with a mixture of one or more of the polymerizable, ethylenically unsaturated monomers described above, and one or more of the polymers described above. Likewise, if desired, mixtures of the above polyisocyanates and aminoplast resins can be used, as well as mixtures of either one or both of these materials with the one or more polymers and/or the one or more ethylenically unsaturated monomers described above.

In certain embodiments, the aqueous dispersion of microparticles comprises composite microparticles having a first phase comprising the one or more monomers and/or the one or more polymers previously described (and, if used, organic solvent), and a second phase comprising the color-imparting particles.

As used herein, the term "composite microparticle" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. Alternatively, particles formed from composite materials can be formed from a primary material that is coated, clad or encapsulated with a different form of the primary material. For more information on particles useful in the present invention, see G. Wypych, Handbook of Fillers, 2nd Ed. (1999) at pages 15-202, which are specifically incorporated by reference herein.

The one or more monomers and/or one or more polymers can be present in the aqueous dispersion in an amount of at least 10 weight percent, such as at least 20 weight percent, or, in some embodiments, at least 30 weight percent based on total weight of solids present in the dispersion. Also, the one or more monomers and/or one or more polymers can be present in the dispersion in an amount of up to 80 weight percent, such as up to 70 weight percent, or, in some embodiments, up to 60 weight percent, based on total weight of solids present in the dispersion. The amount of the one or more monomers and/or one or more polymers present in the dispersion can range between any combinations of these values inclusive of the recited ranges.

As previously discussed, known methods for preparing composite color-imparting particles conventionally employ emulsion polymerization techniques whereby monomers are polymerized in the presence of a nanosized particles and/or color-imparting particles to form a stable dispersion of composite microparticles. Such monomers can generally comprise relatively high levels of hydrophilic monomers, for example carboxylic acid group-containing monomers, as well as relatively high levels of hydrophilic surfactants or dispersants. The hydrophilic nature of such dispersions, if included in a coating composition, may adversely affect humidity resistance or may impart undesirable water sensitivity. The aqueous dispersion of microparticles comprising color-imparting particles of the present invention can minimize or eliminate altogether the aforementioned negative effects because the binder system (i.e. polymer and surfactant, if any) typically has an acid value of less than or equal to 40 mg KOH/gram binder system, or less than or equal to 30 mg KOH/gram of binder system, or less than or equal to 20 mg KOH/gram of binder system.

In certain embodiments, the aqueous dispersion of microparticles comprising color-imparting particles is prepared, after the color-imparting particles are admixed with the one or more polymerizable monomers and/or the one or more polymers as discussed above, by subjecting the admixture to high stress shear conditions in the presence of an aqueous medium to particularize the admixture into microparticles. The high stress shear can be accomplished by any of the high stress shear techniques well known in the art.

As used herein, the term "high stress shear conditions" is meant to include not only high stress techniques, such as by the liquid-liquid impingement techniques discussed in detail below, but also high speed shearing by mechanical means. It should be understood that, if desired, any mode of applying stress to the admixture can be utilized so long as sufficient stress is applied to achieve particularization of the admixture and the requisite particle size distribution.

The admixture can be subjected to the appropriate stress by use of a MICROFLUIDIZER® emulsifier which is available from Microfluidics Corporation in Newton, Mass. The MICROFLUIDIZER® high-pressure impingement emulsifier is described in detail in U.S. Pat. No. 4,533,254, which is hereby incorporated by reference. The device consists of a high-pressure (up to about $1.4 \times 10^5$ kPa (20,000 psi)) pump and an interaction chamber in which emulsification takes place. The pump forces the admixture, typically in aqueous medium, into the chamber where it is split into at least two streams which pass at very high velocity through at least two slits and collide, resulting in the formation of small particles, i.e., the admixture is "particularized". Generally, the pre-emulsion admixture is passed through the emulsifier at a pressure of between about $3.5 \times 10^4$ and about $1 \times 10^5$ kPa (5,000 and 15,000 psi). Multiple passes can result in smaller average particle size and a narrower range for the particle size distribution. When using the aforesaid MICROFLUIDIZER® emulsifier, stress is applied by liquid-liquid impingement as has been described. As mentioned above, other modes of applying stress to the pre-emulsification admixture can be utilized so long as sufficient stress is applied to achieve the requisite particle size distribution. For example, one alternative manner of applying stress would be the use of ultrasonic energy.

Stress is described as force per unit area. Although the precise mechanism by which the MICROFLUIDIZER® emulsifier stresses the pre-emulsification admixture to particularize it is not thoroughly understood, it is theorized that stress is exerted in more than one manner. It is believed that one manner in which stress is exerted is by shear, that is, the force is such that one layer or plane moves parallel to an adjacent, parallel plane. Stress can also be exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occurs violently over a short time period and produces intense stress. Although not intending to be bound by any particular theory, it is believed that both shear and cavitation contribute to producing the stress which particulates the pre-emulsification mixture.

As discussed above, in various embodiments of the present invention, the color-imparting particles can be admixed either with one or more polymerizable, ethylenically unsaturated monomers, or with one or more polymerizable, ethylenically unsaturated monomers and one or more polymers. If any of these methods is employed, the polymerizable ethylenically unsaturated monomers (and polymers if used) are blended with the color-imparting particles and an aqueous medium to form a pre-emulsion admixture. The pre-emulsion admixture is then subjected to high stress conditions as described above to particularize the admixture thereby forming microparticles. The polymerizable species within each particle are subsequently polymerized (i.e. the polymer is formed in situ, typically under suitable free-radical polymerization conditions as described below) under conditions sufficient to produce composite microparticles (each having a first organic or polymeric phase, and a second color-imparting particle phase) which are stably dispersed in the aqueous medium.

In some cases, a surfactant or dispersant can be present to stabilize the dispersion. The surfactant usually is present when the organic component referred to above is mixed into the aqueous medium prior to formation of the microparticles. Alternatively, the surfactant can be introduced into the medium at a point just after the microparticles have been formed.

Anionic, cationic and nonionic surfactants are suitable for use in preparation of such aqueous dispersions. Other materials well known to those skilled in the art are also suitable for use herein. Generally, both ionic and non-ionic surfactants are used together and the amount of surfactant can range from about 1 percent to 10 percent, typically less than 2 percent based on total solids present in the aqueous dispersion.

It should be understood that, the amount of surfactant necessary to produce a stable dispersion of microparticles often can be minimized by the use of other ingredients that facilitate stability of the dispersion. For example, a polymer containing acid functionality that can be neutralized with an amine to form a water-dispersible polymer can be used to disperse other ingredients including the color-imparting particles.

In order to conduct the polymerization of the ethylenically unsaturated monomers in the presence of the color-imparting particles (and the polymer, if used), a free radical initiator typically is present. Both water-soluble and oil soluble initiators can be used. Examples of water-soluble initiators include ammonium peroxydisulfate, potassium peroxydisulfate and hydrogen peroxide. Examples of oil soluble initiators include t-butyl hydroperoxide, dilauryl peroxide and 2,2'-azobis (isobutyronitrile). Generally, the reaction is carried out at a temperature ranging from 20° to 80° C. The polymerization can be carried out in either a batch or a continuous process. The length of time necessary to carry out the polymerization can range from 10 minutes to 6 hours, provided that the time is sufficient to form a polymer in situ from the one or more ethylenically unsaturated monomers.

Once the microparticles have been formed and the polymerization process, if any, is complete, the resultant product is a stable dispersion of microparticles in an aqueous medium which can contain some organic solvent. Some or all of the organic solvent can be removed via reduced pressure distillation at a temperature of less than 40° C. By "stable dispersion" is meant that the microparticles neither settle nor coagulate nor flocculate upon standing.

In certain embodiments, the present invention is directed to an article having a color-imparting non-hiding coating layer deposited thereon, wherein the coating layer is deposited from a protective coating composition comprising an aqueous dispersion of microparticles comprising color-imparting particles having a maximum haze of about 10%, where the aqueous dispersion of microparticles is prepared by any of the above-described methods.

It should be understood that the aqueous dispersion of microparticles comprising color-imparting particles may be the primary film-forming component of such coating compositions, or, alternatively, such compositions may also can include a resinous binder system comprising one or more film-forming polymers which may or may not include reactive functional groups, and/or, if appropriate, a curing agent having functional groups reactive with those of the film-forming polymer. As previously mentioned, the one or more polymers, or the one or more polymers formed in situ via polymerization of the one or more monomers used in the preparation of the microparticles may contain reactive functional groups. Such polymers having reactive groups are available for reaction, with a crosslinking agent, for example, with an aminoplast or polyisocyanate included in the organic phase of the microparticle, or for reaction with any of the crosslinking, i.e., curing agents (described above) included in the coating composition.

It should be understood that the amount of the aqueous dispersion of microparticles comprising color-imparting particles present in the protective coating compositions can vary widely depending upon a variety of factors, e.g., the final color desired, the curing method to be used, desired coating performance properties, etc. For example, the aqueous dispersion of microparticles comprising color-imparting particles can be present in the coating composition in an amount as low as 0.05 weight percent (e.g., when used as a pigment tint paste), and as high as 100 weight percent (e.g., when used as the coating composition itself).

In certain embodiments, the stable aqueous dispersion of microparticles comprising color-imparting particles may be prepared by (a) providing the color-imparting particles described above; (b) admixing in the presence of organic solvent (described below) the color-imparting particles with one or more solventborne, water-dispersible polymers; (c) subjecting the admixture to high stress shear conditions, such as any of the high stress shear methods described above, in the presence of aqueous medium, as described above, to form composite microparticles dispersed in the aqueous medium. The composite microparticles have a first phase comprising the one or more solventborne, water-dispersible polymers and, optionally, the organic solvent, and a second phase comprising the color-imparting particles.

Non-limiting examples of suitable organic solvents can include glycol ethers, such as butyl carbitol, propylene glycolmonobutyl ether, ethylene glycolmonobutyl; alcohols, such as butanol, a-ethylhexanol, tridecylalchol; ketones, such as methyl isobutyl ketone, methylpropyl ketone; esters, such as butyl acetate; aromatic hydrocarbons, such as xylene and toluene; and aliphatic hydrocarbons, such as heptane.

The one or more solventborne, water-dispersible polymers suitable for use in the embodiments described immediately above, are any of a variety of polymers that are dispersible, soluble, or emulsifiable in aqueous medium, such polymers can comprise any of a variety of hydrophilic groups, e.g., hydroxyl groups, amino groups, carboxylic acid groups, or mixtures of such hydrophilic groups. Such hydrophilic groups can be present on the polymer in an amount sufficient to render the polymer dispersible, soluble, or emulsifiable in aqueous media. The polymers can be rendered dispersible in aqueous media either by virtue of being sufficiently hydrophilic, or by neutralization or solubilization with an acid or base to facilitate dispersion.

The protective coating compositions used in the present invention may be used to form a single color-imparting non-hiding layer; or, in certain embodiments, the protective coating compositions may form a layer of a multi-layered system, which includes a clearcoat layer deposited over the color-imparting non-hiding layer. As a result, the present invention is also directed to multi-layer coatings comprising (a) a color-imparting non-hiding layer deposited from a protective coating composition comprising color-imparting particles having a maximum haze of about 10% and a film-forming resin; and (b) a clearcoat layer deposited over the color-imparting non-hiding layer.

The clearcoat layer may be deposited from a composition that comprises any of the film-forming resins described above and can be applied over the color-imparting non-hiding layer to impart additional depth and/or protective properties to the surface underneath. The resinous binders for the basecoat can be organic solvent-based materials or water-based coating compositions. Optional ingredients suitable for inclusion in the clearcoat composition include those which are well known in the art of formulating surface coatings, such as those materials described earlier. The clearcoat composition can be applied to a substrate by any conventional coating technique such as brushing, spraying, dipping or flowing, among others.

The present invention is also directed to a multi-layer coating system comprising (a) a basecoat layer deposited from a film-forming composition comprising a resinous binder and pigment; (b) a color-imparting non-hiding coating layer deposited over at least a portion of the basecoat layer, wherein the color-imparting non-hiding layer is deposited from a protective coating composition comprising (i) color-imparting particles having a maximum haze of about 10%; and (ii) a film-forming resin; and (c) a clearcoat layer deposited over at least a portion of the color-imparting non-hiding layer, wherein the clearcoat layer is deposited from a film-forming composition comprising a resinous binder.

As would be understood by one skilled in the art, coating film thickness and curing temperatures and conditions for the color-imparting non-hiding coating layer will depend upon the type of coating layer to be formed, i.e., a single layer or as a layer of a multi-layered system; as well as the coating composition itself, i.e., whether thermosetting or thermoplastic, whether ambient or thermally curable, and, if thermosetting, the type of curing reaction required.

The protective coating compositions from which the color-imparting non-hiding coating layer is deposited can be applied by any conventional method such as wiping, brushing, dipping, flow coating, roll coating, conventional and electrostatic spraying. Spray techniques are most often used. Typically, film thickness for cured coatings is at least 0.1 mils and can range between 0.5 and 5 mils.

After application, such protective coating compositions may be cured. Several coating compositions can be cured at ambient temperature, such as those having a polyisocyanate or polyanhydride curing agent, or they can be cured at minimally elevated temperatures to hasten the cure. An example would be forced air curing in a down draft booth at about 40° C. to 60° C., which is common in the automotive refinish industry. The ambient temperature curable compositions are usually prepared as a two (2) package system ("2K") in which the ambient curing agent ("crosslinker pack") is kept separate from the film-forming resin ("resin pack") containing the reactive functional group. The packages are combined shortly before application.

Thermally curable coating compositions such as those using, blocked isocyanate, aminoplast, phenoplast, polyepoxide or polyacid curing agent can be prepared as a one-package system ("1K"). These compositions are cured at elevated temperatures, typically for 1 to 30 minutes at about 250° F. to about 450° F. (121° C. to 232° C.) with temperature primarily dependent upon the type of substrate used. Dwell time (i.e., time that the coated substrate is exposed to elevated temperature for curing) is dependent upon the cure temperatures used as well as wet film thickness of the applied coating composition. For example, coated automotive elastomeric parts require a long dwell time at a lower cure temperature (e.g., 30 minutes at 250° F. (121° C.)), while coated aluminum beverage containers require a very short dwell time at a very high cure temperature (e.g., 1 minute at 375° F. (191° C.)). 1K systems can also be cured by exposure to actinic radiation, such as UV light or electron beam.

Illustrating the invention are the following examples that are not to be considered as limiting the invention to their details. All parts and percentages in the examples, as well as throughout the specification, are by weight unless otherwise indicated.

EXAMPLES

Examples 1 to 4 describe the preparation of color imparting particles having a maximum haze of 10%.

Example 1

Chromothal® Yellow 8GN (available from Ciba Specialty Chemicals Corporation, Tarrytown, N.Y.) was milled and dispersed on an Advantis® mill (available from Draiswerke, Inc., Mahwah, N.J.). Table 1 sets forth the components and milling conditions to produce the dispersions of color-imparting particles.

For analysis, the final dispersion of color-imparting particles was diluted with n-butyl acetate. Table 2 lists the properties of the final dispersion of color-imparting particles. The average primary particle size was obtained with a Philips CM12 transmission electron microscope (TEM) at 100 kV. The % haze was measured with a Byk-Gardner TCS (The Color Sphere) instrument having a 500 micron cell path length.

Example 2

A cyan pigment of Heliogen® Blue L 7081 D (available from BASF Corporation, Mount Oliver, N.J.) was milled and dispersed and then analyzed as in Example 1. See Tables 1 and 2.

Example 3

A green pigment of Monolite® Green 860/Monastrol Green 6Y (available from Avecia) was milled and dispersed and analyzed as in Example 1. See Tables 1 and 2.

Example 4

A red pigment of Irgazin® Red 379 (available from Ciba Specialty Chemicals Corporation) was milled and dispersed and analyzed as in Example 1. See Tables 1 and 2.

TABLE 1

| % of mill base (by weight) | Example 1 | Example 2 | Example 3 | Example 4 |
|---|---|---|---|---|
| Pigment | 8.17 | 13.24 | 9.34 | 9.52 |
| Solsperse ® 5000[1] | 0 | 2.07 | 0.89 | 0 |
| Solsperse ® 22000[2] | 0 | 0 | 0 | 0.94 |
| Zonyl ® FSO[3] | 0.12 | 0 | 0 | 0 |
| Solsperse ® 32500[4] | 0 | 29.94 | 41.12 | 26.35 |
| Dispersant[5] | 10.73 | 0 | 0 | 0 |
| Acrylic Grind polymer[6] | 30.20 | 0 | 0 | 0 |
| n-butyl acetate | 37.60 | 48.86 | 36.60 | 37.10 |
| Dowanol PM acetate[7] | 13.23 | 5.89 | 12.05 | 0 |
| Mill residence time (min.) | 185 | 55 | 103 | 25 |
| Media Size (mm) | 0.3 | 0.3 | 0.2 | 0.1 |

[1]Commercially available from the Lubrizol Corporation, Wickliffe, Ohio.
[2]Commercially available from the Lubrizol Corporation, Wickliffe, Ohio.
[3]Commercially available from E.I. DuPont DeNemours, Inc., Wilmington, Delaware.
[4]Commercially available from the Lubrizol Corporation, Wickliffe, Ohio.
[5]A quaternary ammonium group containing polymer prepared as generally described in U.S. Pat. No. 6,365,666 B, by atom transfer radical polymerization techniques from the following monomers on a weight basis: 4.7% glycidyl methacrylate, 20.3% benzylmethacrylate, 14.1% butylmethacrylate, 52.3% 2-ethylhexylmethacrylate and 7.1% of hydroxypropyl methacrylate. The polymer has an M(n) of 9505 and an M(w) of 15,445 as determined by gel permeation chromatography using a polystyrene standard.
[6]An acrylic polymer iminated with propylene imine prepared by solution polymerization techniques from the following monomers on a weight basis: 29.32% styrene, 19.55% 2-ethylhexyl acrylate, 19.04% butyl methacrylate, 9.77% 2-hydroxyethyl acrylate, 1.86% methacrylic acid, and 0.59% acrylic acid.
[7]Commercially available from Dow Chemical Co., Midland, Michigan.

TABLE 2

| Properties | Example 1 | Example 2 | Example 3 | Example 4 |
|---|---|---|---|---|
| TEM primary particle size (nm) | 100 | 30 | 20 | 40 |
| % Haze[8] | 9.18 | 0.13 | 0.33 | 0.25 |
| % Total Solids (by weight)[9] | 31.42 | 38.43 | 24.9 | 27.49 |
| % Pigment (by weight) | 8.92 | 9.73 | 8.75 | 13.05 |

[8]Percent haze at a transmittance of about 17.5% at the wavelength of maximum absorbance.
[9]The dispersions of color-imparting particles were adjusted to attain these final % solids and % pigment values.

Examples 5 through 8

Examples 5 through 8 describe the preparation of protective coating compositions comprising the color-imparting particles of Examples 1 through 4 as shown in Table 3. All compositions were prepared by mixing the components by weight in the order of addition shown by Table 3. The "Color Pack" was co-blended with the "Crosslinker Pack" just prior to substrate application. Additional DT885 Reducer was added for viscosity adjustment.

TABLE 3

| | Example | | | |
|---|---|---|---|---|
| | 5 | 6 | 7 | 8 |
| "Color Pack" | | | | |
| Example 1 | 8.49 | — | — | — |
| Example 2 | — | 6.66 | — | — |
| Example 3 | — | — | 10.08 | — |
| Example 4 | — | — | — | 11.61 |
| DCU2042[10] | 58.80 | 58.36 | 58.39 | 58.20 |
| DT885[11] | 13.40 | 13.30 | 13.30 | 13.26 |
| "Crosslinker Pack" | | | | |
| DCX 61[12] | 16.63 | 16.51 | 16.52 | 16.46 |

TABLE 3-continued

| | Example | | | |
|---|---|---|---|---|
| | 5 | 6 | 7 | 8 |
| "Reducer Pack" | | | | |
| DT885 | 2.67 | 5.16 | 1.71 | 0.47 |

[10] DCU2042 Fast Dry Clearcoat, commercially available from PPG Industries, Inc. Pittsburgh, PA.
[11] DT885 Reducer, commercially available from PPG Industries, Inc. Pittsburgh, PA.
[12] DCX 61 High Solids Hardener, commercially available from PPG Industries, Inc. Pittsburgh, PA.

Comparative Examples 9 through 12

Comparative Examples 9 through 12 were prepared using the components as shown in Table 4. In the comparative examples, each pigment dispersion from Examples 5 through 8 was replaced by a corresponding high-performance dye. For example, in Comparative Example 9, the yellow pigment dispersion of Example 5 was a yellow dye solution. Pigment and weight solids were held constant in all of Examples 5 through 12.

All Comparative Examples were prepared by mixing the components by weight in the order of addition shown by Table 4. The "Color Pack" was co-blended with the "Crosslinker Pack" just prior to substrate application. Additional DT885 Reducer was added for viscosity adjustment if necessary.

TABLE 4

| | Comparative Examples | | | |
|---|---|---|---|---|
| | 9 | 10 | 11 | 12 |
| "Color Pack" | | | | |
| DMX 210[13] | 5.42 | — | — | — |
| DMX 216[14] | — | 7.43 | — | — |
| DMX 217[15] | — | — | 5.59 | — |
| DMX 212[16] | — | — | — | 5.59 |
| DCU2042 | 60.48 | 60.42 | 60.47 | 60.47 |
| DT885 | 13.78 | 13.77 | 13.78 | 13.78 |
| "Crosslinker Pack" | | | | |
| DCX 61 | 17.11 | 17.09 | 17.11 | 17.11 |
| "Reducer Pack" | | | | |
| DT885 | 3.21 | 1.29 | 3.05 | 3.05 |

[13] A yellow dye solution commercially available from PPG Industries, Inc.
[14] A blue dye commercially available from PPG Industries, Inc. f
[15] A green dye solution commercially available from PPG Industries, Inc.
[16] A red dye solution commercially available from PPG Industries, Inc.

Test Substrates

Percent opacity of Examples 5 through 12 were determined by drawing down each example with a 48 gauge, wire drawdown rod (available from Paul N. Gardner Co. Inc., Pompano Beach, Fla.) over Leneta paper Form 1B (available from The Leneta Company, N.J.) and measuring the percent opacity using the Minolta Spectrophotometer CM-3600d according to the instructions provided by the manufacturer.

Initial measurements were taken for dry film thickness using the Fisherscope MMS (Multi-measuring System) instrument. Dry film thickness was determined by drawing down each example with the same 48 gauge wire drawdown rod over colled roll steel. The appropriate probe was chosen to measure the dry film thickness of each coating.

All drawdowns of Examples 5 through 12 were cured at ambient conditions for 24 hours. The percent opacity for each example can be found in Table 5 at a specific dry film thickness.

TABLE 5

| Example | DFT (mils) | Percent Opacity |
|---|---|---|
| Comparative Example 9 | 1.08 | 12.87 |
| Example 5 | 1.10 | 8.15 |
| Comparative Example 12 | 1.16 | 48.74 |
| Example 8 | 1.07 | 49.32 |
| Comparative Example 11 | 1.02 | 34.25 |
| Example 7 | 1.00 | 18.68 |
| Comparative Example 10 | 1.00 | 21.19 |
| Example 6 | 0.98 | 36.70 |

Color was measured using the Minolta Spectrophotomer CM3600-d with the CIELAB model of color space. D65 daylight source and 10° degree angle were chosen. Initial color readings (prior to QUV testing) were taken on each coated panel. These coated panels were prepared by drawing down each example with a 24 gauge, wire drawdown rod (available from Paul N. Gardner Co. Inc., Pompano Beach, Fla.) over aluminum substrate with millfinish 3105 (commercially available from ACT Laboratories, Inc.). Initial measurements were taken for dry film thickness on the panels was measured using the Fisherscope MMS (Multi-measuring System) instrument. The appropriate probe was chosen to measure the dry film thickness of each coating.

The coated panels were then tested in accelerated weathering conditions using the QUV/se Accelerated Weather Tester available from Q-Panel Lab Products, 800 Cantebury Road, Cleveland, Ohio 44145. The light source used for all panels was provided by UVB-313 nanometer bulbs. The irradiance value was set at 0.48 watts/meter$^2$/nanometer at calibration wavelength. All panels were subject to an alternating test cycle of eight (8) hours light exposure at 70° C. followed by four (4) hours condensation exposure at 50° C. The panels were exposed to these cyclic conditions for 750 hours. After 750 hours, the panels were removed from the QUV cabinet and color measurements were taken on each of them to generate a color difference (ΔE*ab) value. These results are shown in Table 6. The examples are grouped according to the corresponding comparative example (containing dyes) for each pigment type.

TABLE 6

| Example | Dry Film Thickness (mils) | ΔE*ab after 750 hours QUV testing |
|---|---|---|
| Comparative Example 9 | 0.52 | 4.13 |
| Example 5 | 0.84 | 2.85 |
| Comparative Example 12 | 0.56 | 6.25 |
| Example 8 | 0.51 | 0.71 |
| Comparative Example 11 | 0.49 | 30.04 |
| Example 7 | 0.50 | 7.27 |
| Comparative Example 10 | 0.53 | 32.65 |
| Example 6 | 0.55 | 2.92 |

Examples 13 to 16

Examples 13 to 16 were prepared in the following manner. The compositions of Examples 6 and 7 were hand spray applied onto 4×12 inch panels prepared as follows. The 4×12 inch panels were type APR24711 (cold roll steel; ED5000 ecoat; GPX primer) available from ACT Laboratories, Inc.

First, a primer layer was hand spray applied to the APR24711 panels. The primer was DP40LF/DP401LF epoxy primer commercially available from PPG Industries, Inc. The blend ratio of the primer was 2 to 1 by volume per the technical data sheet instructions. All spray and dry requirements were followed as stipulated by the technical data sheet. The compositions of Example 6 and 7 were then applied.

Next, in Examples 13 and 15, a basecoat layer was hand spray applied over the DP40LF/401LF primer. The white basecoat was Global D751, commercially available from PPG Industries, Inc. The white basecoat was blended with D871 Reducer and DX57 Basecoat Activator (both available from PPG Industries, Inc.) and applied and cured as per the instructions on the technical data sheet.

Next, a clearcoat layer was applied over Examples 6 and 7 such that Examples 6 and 7 without a clearcoat layer could be compared to Examples 6 and 7 with a clearcoat layer.

The clearcoat was prepared by mixing DCU2042 (clearcoat commercially available from PPG Industries, Inc.) with DCX61 (crosslinker package commercially available from PPG Industries, Inc.) and reduced with DT885 (Reducer package commercially available from PPG Industries, Inc.) at a volumetric ratio of 4 to 1 to 1. The clearcoat layer was applied and allowed to cure at ambient conditions for 7 days prior to testing. Initial color was measured as described above, then the coated panels were subjected to QUV testing as indicated above. After 1000 hours, the panels were removed from the QUV cabinet and color measurements were taken on each to generate ΔE values. These results are shown in Table 7.

TABLE 7

| Example | D751 White Basecoat | DCU2042 Clearcoat Layer | ΔE*ab after 1000 hours QUV testing |
| --- | --- | --- | --- |
| Example 13 | Yes | Yes | 1.32 |
| Example 14 | Yes | No | 2.67 |
| Example 15 | Yes | Yes | 0.21 |
| Example 16 | Yes | No | 0.83 |

Example 17A

This example describes the preparation of a polyurethane/urea dispersant which was subsequently used to the form the respective aqueous dispersion of Example 18 below. The polyurethane/urea dispersant was prepared from a batch of the following mixture of ingredients in the ratios indicated:

| Ingredients | Equivalents | Weight (grams) |
| --- | --- | --- |
| Charge I | | |
| N-methyl pyrrolidinone | | 269.8 |
| Hydroxyethyl methacrylate (HEMA) | 0.70 | 91.1 |
| Dimethylolpropionic acid (DMPA) | 3.50 | 234.7 |
| Triphenyl phosphite | | 2.2 |
| Dibutyltin dilaurate | | 2.2 |
| Butylated hydroxytoluene | | 2.2 |
| Charge II | | |
| Poly (butylene oxide)[17] | 1.40 | 700.0 |

-continued

| Ingredients | Equivalents | Weight (grams) |
| --- | --- | --- |
| Charge III | | |
| Methylene bis(4-cyclohexylisocyanate) | 8.40 | 1100.4 |
| Charge IV | | |
| Butyl methacrylate | | 481.8 |
| Charge V | | |
| Butyl acrylate | | 642.5 |
| Charge VI | | |
| Deionized water | | 4263.3 |
| Dimethylethanolamine | 1.40 | 124.7 |
| Diethanolamine | 0.70 | 73.6 |
| Ethylenediamine | 1.40 | 42.1 |

[17]Poly (butylene oxide) having a number average molecular weight of 1000.

Charge I was stirred in the flask at a temperature of 100° C. until all solids were dissolved. Charge II was added and the mixture was reheated to 70° C. Charge II was added over a 15 minute period. Charge IV was added and the resulting mixture was held at 90° C. for 3 hours. Charge V was added. Charge VI was stirred in a separate flask and heated to 70° C. The reaction product of Charges I, II, III, IV, and V was added to Charge VI and the resulting mixture was cooled to room temperature. The final product was a white emulsion with an acid value of 15.2, a Brookfield viscosity of 800 centipoise (spindle #3 at 60 rpm), a pH of 7.4, and a nonvolatile content of 28.4% as measured at 110° C. for one hour.

Example 17B

This example describes the preparation of an acrylic dispersant which was subsequently used to form the respective pigment dispersion of Example 17C. The acrylic dispersant was prepared from a batch of the following mixture of ingredients in the ratios indicated:

| Ingredients | Weight (grams) |
| --- | --- |
| Charge I | |
| Magnesol | 20.0 |
| Toluene | 120.0 |
| Charge II | |
| 2,2'-dipyridyl | 7.5 |
| Copper (0) powder | 6.1 |
| Charge III | |
| Para-toluenesulfonyl chloride | 30.4 |
| Charge IV | |
| Benzylmethacrylate | 169.2 |
| Glycidyl isopropyl ether | 20.0 |
| Charge V | |
| MPEG (550) MA | 888.3 |
| Toluene | 250.0 |

Charge I was mixed in a 2 liter flask with air-stirrer, thermocouple and azeotropic distillation set-up. Charge I was heated to reflux and water was azeotroped off. Charge I was then cooled and put under a nitrogen blanket.

Charges II and III were added in order while maintaining a nitrogen blanket. Charge IV was added to an addition funnel and sparged with nitrogen for 15 minutes prior to addition. Charge IV was added to the reaction flask and the mixture was heated carefully to 70° C. When the solids reached 60.7%, Charge V was charged to an addition funnel and sparged with nitrogen for 15 minutes. Charge V was added to the reaction over 30 minutes while maintaining a 70° C. reaction temperature.

The reaction was heated for 6 hours and then cooled and stirred overnight under a nitrogen blanket. The reaction mixture was thinned with 500 g of toluene and then filtered through a cake of magnesol to remove the residual catalyst.

Solvent was removed under vacuum yielding a resin at 98.4% solids. The number average molecular weight ($M_n$) was 7469. The weight average molecular weight ($M_w$) was 9212. $M_w/M_n$ was 1.2.

Example 17C

This example describes the preparation of a nano-sized PB 15:3 phthalocyanine blue pigment dispersion which was subsequently used to form the aqueous dispersion of Example 18. The pigment dispersion was prepared from a batch of the following mixture of ingredients in the ratios indicated:

| Ingredients | Weight (grams) |
|---|---|
| Deionized water | 2077.4 |
| Acrylic dispersant of Example 17B | 1360.8 |
| Dimethylethanolamine | 10.2 |
| PB 15:3 pigment[18] | 2358.7 |

[18]PB 15:3, phthalocyanine blue pigment, commercially available from BASF Corp.

The ingredients were ground in an Advantis V15 Drais mill containing 0.3 mm YTZ grinding media. The mixture was milled at 1650 rpm for a total residence time of 218 minutes. The progress of the milling was monitored by measuring the visible spectra of samples and observing the decrease in absorbance at a wavelength of 400 nanometers. During the course of the milling 4535.9 g of water and 544.3 g propylene glycol monobutyl ether was added to make a final mixture with a nonvolatile content of 24.4% as measured at 110° C. for one hour. The particle size was 139 nanometers as measured using a Horiba Model LA 900 laser diffraction particle size instrument, which uses a helium-neon laser with a wavelength of 633 nanometers to measure the size of the particles and assumes the particles have a spherical shape, i.e., the "particle size" refers to the smallest sphere that will completely enclose the particle. The percent haze was 1.0% and measured as described in Example 1.

Example 18

This example describes the preparation of an aqueous dispersion of microparticles which contains nano-sized PB 15:3 phthalocyanine blue pigment. The dispersion was prepared from the following ingredients:

| Ingredients | Weight (grams) |
|---|---|
| Charge I | |
| Polyurethane/urea of Example 17A | 578.6 |
| PB 15:3 phthalocyanine blue pigment dispersion of Example 17C | 432.0 |
| Propylene glycol monobutyl ether | 90.0 |
| Butyl acrylate | 57.0 |
| Charge II | |
| Deionized water | 40.0 |
| Charge III | |
| Sodium metabisulfite | 0.6 |
| Ferrous ammonium sulfate | 0.01 |
| Deionized water | 10.0 |
| Charge IV | |
| 70% t-butyl hydroperoxide | 0.6 |
| Deionized water | 10.0 |

A pre-emulsion was made by stirring Charge I with a cowles blade in a stainless steel beaker. The pre-emulsion was passed twice through a Microfluidizer© M110T at 8000 psi and transferred to a fourneck round bottom flask equipped with an overhead stirrer, condenser, electronic temperature probe, and a nitrogen atmosphere. Charge II was used to rinse the Microfluidizer© and added to the flask. The temperature of the microemulsion was adjusted to 30° C. The polymerization was initiated by adding Charge III followed by a 30 minute addition of Charge IV. The temperature of the reaction increased to 43° C. The final pH of the latex was 7.0, the nonvolatile content was 32.6%, and the Brookfield viscosity was 56 cps (spindle #2, 60 rpm).

Example 19

Example 18 was used to prepare the following protective coating composition designated as Example 19. All components were added by weight under mild agitation in the order shown by Table 8.

TABLE 8

| Component (by weight) | Weight | Solids |
|---|---|---|
| Blue aqueous dispersion of Example 18. | 93.47 | 26.15 |
| Diisopropyl amine | 0.43 | — |
| Aquaflow NLS210 Solution[19] | 1.15 | 0.13 |
| Baysilone 3739[20] | 0.23 | 0.17 |
| Water Reducible Polyurethane[21] | 6.96 | 2.61 |
| Deionized Water | 22.00 | — |

[19]Aquaflow NLS 210 rheology modifier, commercially available from Hercules, Inc. was used to prepare the following pre-solution: Deionized water; Diethylene glycol monobutyl ether; Aquaflow NLS 210 at 20/5/20 weight ratio respectively.
[20]Baysilone 3739, polyether-modified methyl polysiloxane commercially available from Bayer Corporation.
[21]Water-reducible polyurethane resin formed from adipic acid dihydrazide, dimethylol propionic acid, poly (tetramethylene ether) glycol, isophorone diisocyanate (3.0/6.1/68.2/22.7 weight ratio) at 37.5% solids in dimethylethanol amine, methyl ethyl ketone, and deionized water (2.6/0.8/96.6 weight ratio).

Example 19 was evaluated against Comparative Example 20, Envirobase T412 Transparent Blue Basecoat (commercially available from PPG Industries, Inc.). Both examples were spray applied over primed electrocoated 4×12 inch panels available as APR 43741 from ACT Laboratories, Inc. of Hillsdale, Mich. The panels were wet sanded with P600 grit sand paper, washed with water, and dried.

The blue basecoat compositions were hand-spray applied over the prepared panels using a DeVilbiss GTI HVLP gravity feed spray gun equipped with a 413 needle, 1.2 air nozzle, and No. 2000 air cap. Air pressure at the base of the gun was 28 lbs/inch$^2$ (2 kg/cm$^3$). Envirobase T412 Transparent Blue Basecoat (Comparative Example 20) was prepared for spray application as the respective product data sheet instructed. Example 19 was sprayed with no additional modifications.

Each example was applied in two coats with an approximate 5 minute flash between coats at about 70° F. (21° C.) temperature and about 68% relative humidity. The coating was allowed to ambient flash about 30 minutes prior to clearcoat application.

The clearcoat was hand-spray applied using the same spray gun as was used for the blue basecoats. The clearcoat was Concept® DCU2055 Clear available from PPG Industries, Inc. The clearcoat was mixed with DCX61 High Solids Hardener (PPG Industries, Inc.) and D871 Medium Thinner (PPG Industries, Inc.) at a volumetric ratio of 3:1:0.5. The clearcoat was applied in two coats with a 10 minute ambient flash between the coats at about 70° F. (21° C.) temperature and about 40% relative humidity. A dry film thickness of about 1.50-1.90 mils was achieved. The panels were allowed to ambient cure in a horizontal position for 7 days prior to testing.

The panels were tested for dry film thickness, initial 20 degree gloss, initial adhesion as well as 20 degree gloss and adhesion after 10 days humidity testing.

Dry film thickness was measured using the Fisherscope MMS (Multi-measuring System) instrument. The appropriate probe was chosen to measure the dry film thickness of each coating. The value is reported in Table 9 in mils. Both examples were sprayed over a black and white hiding chart (available from The Lenata Company), but neither example provided hide to that chart. The chart could be seen. The 20 degree gloss was measured using a BYK Gardner micro-TRI-gloss instrument.

Adhesion of the cured coating to the substrate was measured by cutting two sets of six (6) parallel lines through the cured coating to the substrate surface using a cutting edge. First, six parallel lines were cut spaced two (2) millimeters apart with the aid of a spacing template. Each line was approximately two (2) inches in length. Then, a second set of six (6) parallel lines was cut perpendicular to the first set. Each line was also approximately two (2) inches in length. The result was a grid of 25 squares. A piece of 3M Tape #898 (approximately 3 inches long) was placed over the scribed grid and firmly smoothed to ensure good contact. Within ninety (90) seconds of tape application, the tape was rapidly pulled off in one continuous motion. The pulling action was directed toward the test performer while keeping the tape as close as possible to a 60-degree angle. The reported value represents the percentage of film remaining on the substrate. Therefore, one hundred (100) means no failure.

Humidity resistance was evaluated by exposing test panels to an environment with a relative humidity of 95% to 100% and a temperature of 40° C. (104° F.). The panels were kept in this environment for ten (10) days and then removed for testing. All tests are performed within one hour from the time the test had ended.

Results from the above tests can be seen in Table 9.

TABLE 9

| Example # | Dry Film Thickness (mils) BC | Dry Film Thickness (mils) CC | Initial 20 degree gloss | Initial Adhesion (%) | Post Humidity 20 degree gloss | Post Humidity Adhesion (%) |
|---|---|---|---|---|---|---|
| Comparative Example 20 | 0.34 | 1.50-1.90 | 89 | 100 | 88 | 50 |
| Example 19 | 1.00 | 1.50-1.90 | 88 | 100 | 81 | 75 |

Whereas particular embodiments of this invention have been described above for purposes of illustration, it will be evident to those skilled in the art that numerous variations of the details of the present invention may be made without departing from the invention as defined in the appended claims.

Therefore, we claim:

1. A multi-layer coating system comprising:
   a) a metallic basecoat layer deposited from a film-forming composition comprising a resinous binder and a metallic pigment;
   b) a color-imparting non-hiding coating layer deposited over at least a portion of the basecoat layer, wherein the color-imparting non-hiding layer is deposited from a protective coating composition comprising (i) color-imparting organic pigments of one or more colors having an average primary particle size of less than 150 nanometers and having a maximum haze of about 10%; and (ii) a film-forming resin; and
   c) a clearcoat layer deposited over at least a portion of the color-imparting non-hiding layer, wherein the clearcoat layer is deposited from a film-forming composition comprising a resinous binder, wherein one or more of the layers a), b) and c) is capable of ambient cure.

2. The multi-layer coating system of claim 1, wherein the color-imparting organic pigments have a maximum haze of 5%.

3. The multi-layer coating system of claim 1, wherein the color-imparting organic pigments have a maximum haze of 1%.

4. The multi-layer coating system of claim 1, wherein the color-imparting organic pigments have a maximum haze of 0.5%.

5. The multi-layer coating system of claim 1, wherein the color-imparting organic pigments comprise a mixture of organic pigments of at least two or more colors.

6. The multi-layer coating system of claim 1, wherein the organic pigments are selected from the group consisting of perylenes, quinacridones, phthalocyanines, isoindolines, dioxazines (that is, triphenedioxazines), 1,4-diketopynolopyrroles, anthrapyrimidines, anthanthrones, flavanthrones, indanthrones, perinones, pyranthrones, thioindigos, 4,4'-diamino-1,1'-dianthraquinonyl, azo compounds, substituted derivatives thereof, and mixtures thereof.

7. The multi-layer coating system of claim 1, wherein the color-imparting non-hiding coating layer has a percent opacity of no more than 90 percent at a dry film thickness of one (1) mil.

8. The multi-layer coating system of claim 7, wherein the color-imparting non-hiding coating layer has a percent opacity of no more than 50 percent at a dry film thickness of one (1) mil.

9. The multi-layer coating system of claim 1, wherein the protective coating composition further comprises (iii) an optical-effect pigment.

10. The multi-layer coating system of claim 1, wherein the color-imparting non-hiding coating layer is deposited over a reflective surface comprising a reflective material having a total reflectance of at least 30%.

11. The multi-layer coating system of claim 10, wherein the color-imparting non-hiding coating layer is deposited over a reflective surface comprising a reflective material having a total reflectance of at least 40%.

12. The multi-layer coating system of claim 10, wherein the reflective material comprises the basecoat layer.

13. The multi-layer coating system of claim 1, wherein the film-forming resin comprises at least one reactive functional group containing polymer and at least one curing agent having functional groups reactive with the functional group of the polymer.

14. The multi-layer coating system of claim 13, wherein the polymer is selected from the group consisting of acrylic polymers, polyester polymers, polyurethane polymers, and polyether polymers.

15. The multi-layer coating system of claim 14, wherein the polymer comprises reactive functional groups selected from the group consisting of epoxy groups, carboxylic acid groups, hydroxyl groups, isocyanate groups, amide groups, carbamate groups, carboxylate groups and mixtures thereof.

16. A substrate coated with the multi-layer coating system of claim 1.

17. The multi-layer coating system of claim 1, wherein two or more of the layers a), b), and c) are capable of ambient cure.

18. The multi-layer coating system of claim 1, wherein all of the layers a), b), and c) are capable of ambient cure.

19. A multi-layer coating system comprising:
a) a metallic basecoat layer deposited from a film-forming composition comprising a resinous binder and a metallic pigment, wherein the resinous binder consists essentially of a polymer selected from the group consisting of acrylic polymers, polyurethane polymers, polyether polymers, polyvinyl polymers, cellulosic polymers, acrylate polymers, silicon-based polymers, and mixtures thereof;
b) a color-imparting non-hiding coating layer deposited over at least a portion of the basecoat layer, wherein the color-imparting non-hiding layer is deposited from a protective coating composition comprising (i) color-imparting organic pigments of one or more colors having an average primary particle size of less than 150 nanometers and having a maximum haze of about 10%; and (ii) a film-forming resin, wherein the film-forming resin consists essentially of a polymer selected from the group consisting of acrylic polymers, polyurethane polymers, polyether polymers, polyvinyl polymers, cellulosic polymers, acrylate polymers, silicon-based polymers, and mixtures thereof; and
c) a clearcoat layer deposited over at least a portion of the color-imparting non-hiding layer, wherein the clearcoat layer is deposited from a film-forming composition comprising a resinous binder.

* * * * *